United States Patent
Gordon et al.

[11] Patent Number: 5,190,209
[45] Date of Patent: Mar. 2, 1993

[54] PLASTIC CHIME OVERLAY FOR FIBRE DRUM

[75] Inventors: Gerald A. Gordon, Wheeling; John K. Shepard, Bolingbrook; William L. Swihart, deceased, late of Westmont, all of Ill., by Nancy L. Muller, executrix

[73] Assignee: Sonoco Products Company, Hartsville, S.C.

[21] Appl. No.: 525,010

[22] Filed: May 18, 1990

[51] Int. Cl.$^5$ .............................................. B65D 7/44
[52] U.S. Cl. .................................... 229/5.7; 220/359; 220/640; 220/642
[58] Field of Search ............ 220/642, 359, 640; 229/5.5, 5.7

[56] References Cited

U.S. PATENT DOCUMENTS

| | | |
|---|---|---|
| 1,307,351 | 6/1919 | Ford . |
| 2,251,808 | 8/1941 | Rutkowski ........................... 220/642 |
| 2,511,481 | 6/1950 | Schneider . |
| 2,798,654 | 7/1957 | Gibbs, Jr. . |
| 2,912,136 | 11/1959 | Redmond et al. . |
| 3,126,797 | 3/1964 | Carpenter et al. . |
| 3,182,571 | 5/1965 | Carpenter et al. . |
| 3,187,974 | 6/1965 | Rodish . |
| 3,229,593 | 1/1966 | Thompson . |
| 3,266,390 | 8/1966 | Carpenter, Jr. . |
| 3,390,618 | 7/1968 | McArdle . |
| 3,454,207 | 7/1969 | Jackson . |
| 3,659,774 | 5/1972 | Mielke ................................. 220/642 |
| 3,680,733 | 8/1972 | Winslow .............................. 220/642 |
| 4,757,936 | 7/1988 | Homma et al. ..................... 220/642 |

FOREIGN PATENT DOCUMENTS 230758  3/1925  United Kingdom ................. 220/642

Primary Examiner—Joseph Man-Fu Moy
Attorney, Agent, or Firm—Dennison, Meserole, Pollack & Scheiner

[57] ABSTRACT

A corrosion resistent protective plastic overlay is intimately engaged with the chime of a fibre drum and extends from an inner edge portion thermally bonded to the drum lining over the head and into the exterior chime groove. The overlay is fusion bonded to the chime throughout the full extent of the surface-to-surface engagement therebetween.

13 Claims, 2 Drawing Sheets

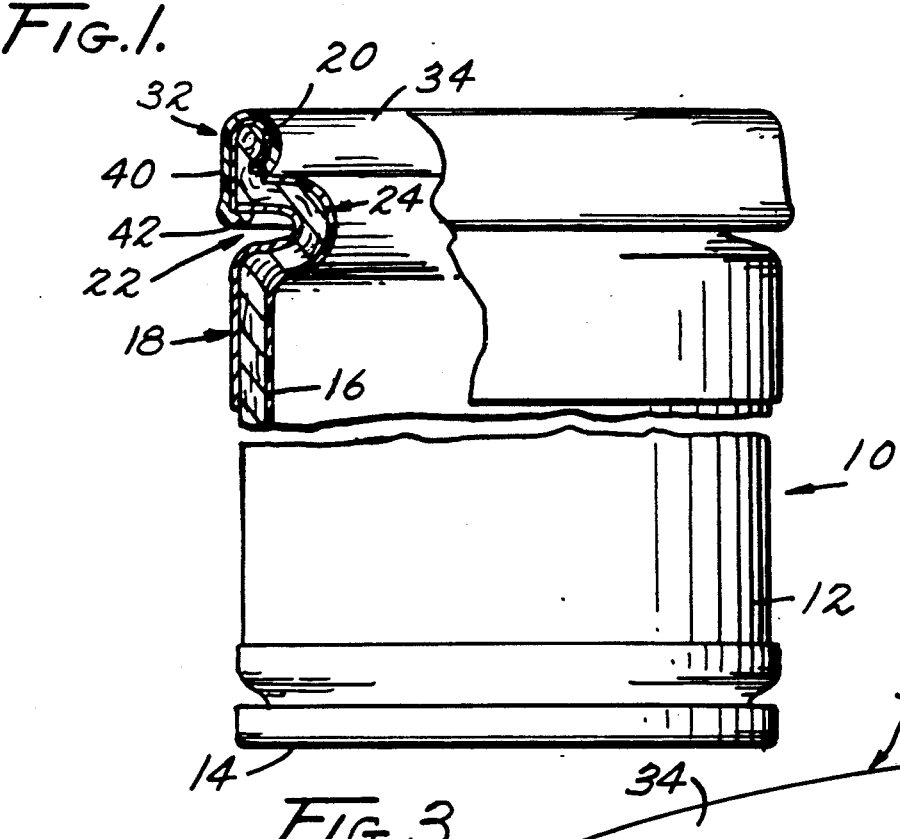
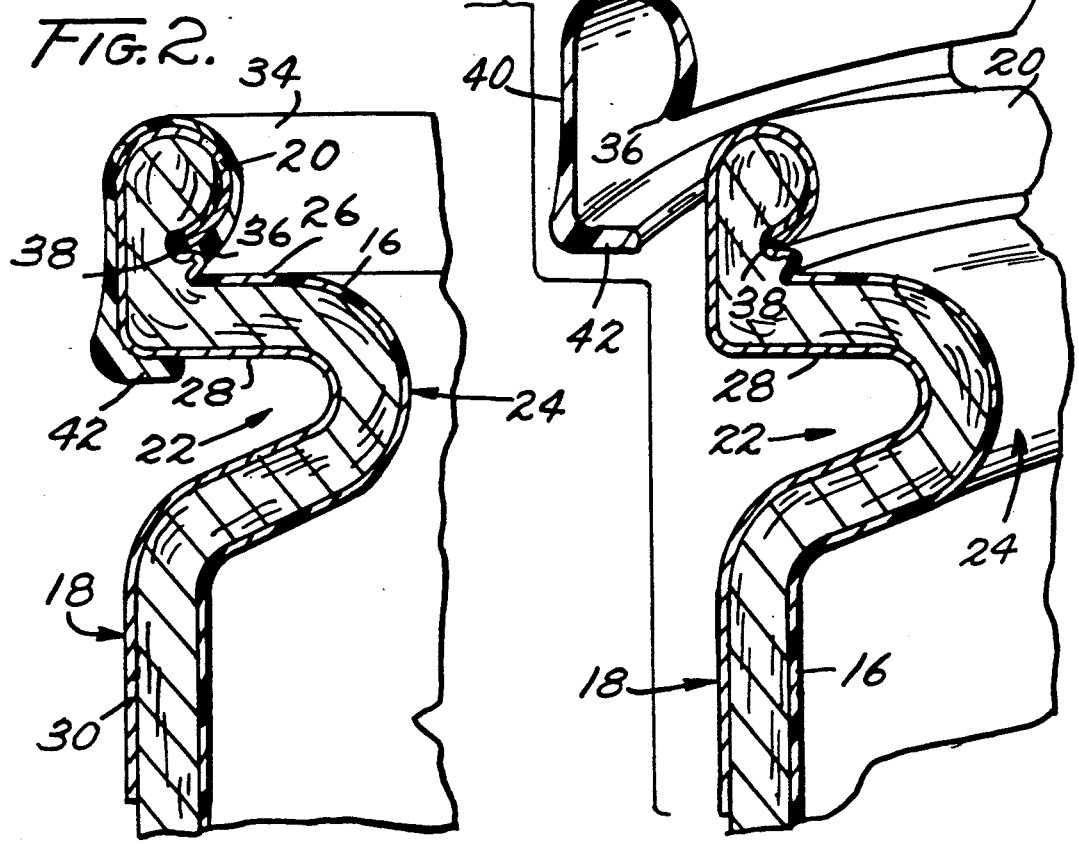

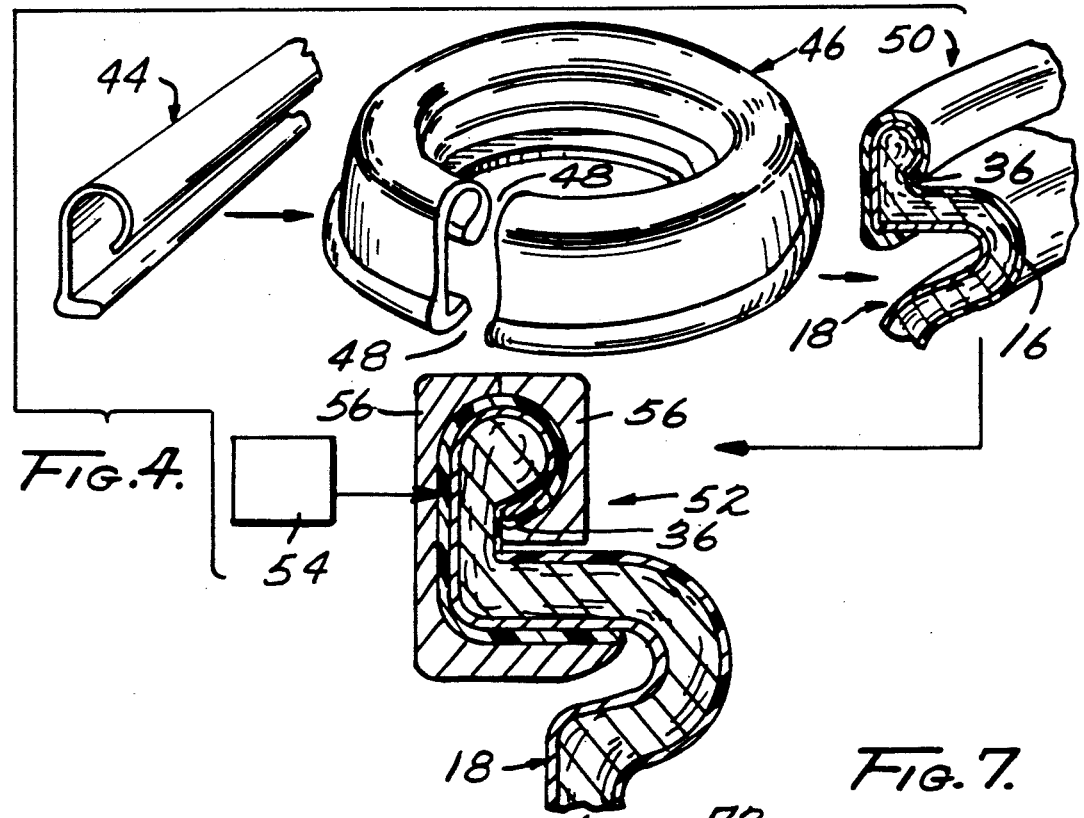
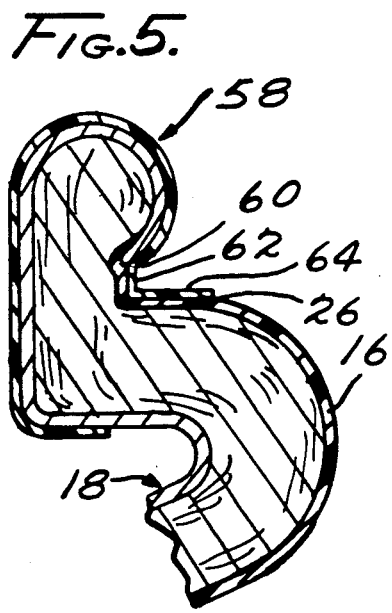
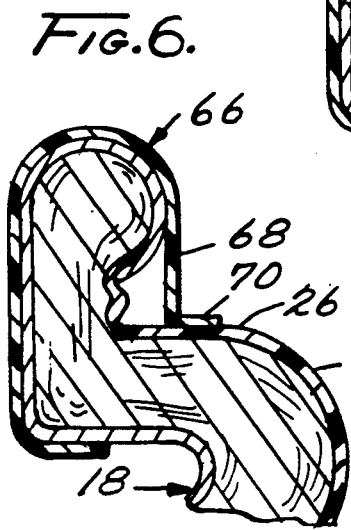
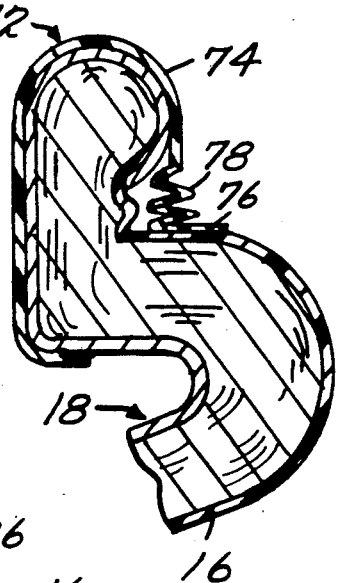

PLASTIC CHIME OVERLAY FOR FIBRE DRUM

BACKGROUND OF THE INVENTION

The invention is concerned with fibre drums having galvanized steel chimes, and in particular such drums which are intended to contain aggressive chemicals as might be expected to corrosively attack the drum, and specifically the steel chime thereof.

The fibre body of the drum, normally formed of multiple convolutely wound paperboard plies, is conventionally protected by a bonded inner liner of corrosive resistent plastic film material such as polyethylene. While such liners effectively protect the interior of the container, there is a continuing problem with regard to providing corrosion protection for the steel chime. The commercial solutions to this problem are considered to be less than adequate.

As one commercial solution to the problem of corrosive attacks, a thin strip of stainless steel is wrapped around the exposed surface of the chime as an overlay prior to the forming of the chime to the container body. However, with such overlays, a potential leakage path exists under the chime and/or between the chime and the overlay. Such leakage may occur if a liquid-containing drum made in this way is stored on its side; similarly, excessive amounts of oxygen and/or water may be transported into the drum by this route. Further, some products are corrosive to stainless steel.

Another current commercial attempt to solve this problem involves the use of a sleeve of polyethylene film bonded at one edge to the drum lining and cuffed to snugly although freely overlie the chime. Such an arrangement will be noted in the patent to Gibbs, Jr. U.S. Pat. No. 2,798,654 issued Jul. 9, 1957. As an alternative method of attaching the film sleeve, the sleeve is crimped under the steel chime by folding it over the end of the tube before the chime is assembled and crimped in place. Such plastic sleeves, loosely overlying the chime, are easily damaged by handling abuse which frequently results in destructive abrasion of the sleeve. Further, difficulties have been encountered in obtaining a continuous bonding or sealing of the loose plastic sleeve to the liner. As the sleeve-to-liner engagement constitutes with such arrangements the only barrier to the corrosive material, any breaching of this barrier will result in an exposure of the entire chime within the sleeve.

SUMMARY OF THE INVENTION

In order to achieve a more effective means of protecting container chimes from the corrosive effects of chemicals and the like, the invention proposes a chime overlay of a chemically inert material which is intimately bonded to both the container liner and the upper portion of the chime, including the bead and the adjoining outer wall section.

The overlay is formed of an appropriate plastic or synthetic resinous material such as, but not limited to, carboxylated high density polyethylene or carboxylated polypropylene which can be thermally bonded, as by induction heating, to the galvanized steel of the chime.

The overlay is extruded in a configuration or profile which closely conforms to that of the chime for a snap-fitting thereto and a snug engagement therewith. The formed profile is cut to length and either snapped directly onto the profile about the open top of the container or drum, or end welded to define a hoop which is in turn snapped over the chime. The overlay is then bonded to the chime, preferably, but not exclusively, by induction heating of the chime sufficiently above the melting point of the plastic of the overlay to melt and fusion bond the overlay to the hot chime. As heat enters the plastic only by conduction from the hot chime, the amount of heat can be controlled whereby the outer visible surface of the chime overlay is not fused and retains its original surface character throughout the fusion process. This not only enables provision of an aesthetically pleasing outer surface, but also will allow the application of pressure to the chime overlay to assure contact between the plastic and steel during the fusion process. Alternatively, if adequate bonding can be achieved without external pressure, this would probably result in a simplification of the heating apparatus. In the absence of external pressure on the overlay during the heating, there might be less precise control of the heat application, such that complete melting may occur in some areas in order that other areas be adequately bonded to the steel chime. However, in the absence of contact with the molten plastic by a pressure applicator, an aesthetically pleasing surface would still result. As another possibility, the drum can be rotated with the chime in the induction field. This would average, or equalize, the heat effect, thus allowing precise control of the distance through the overlay to which fusion extends, and insuring uniformity of appearance of the finished product.

In order to enhance the seal, particularly at the juncture between the plastic overlay and the drum liner, which is preferably an integrally applied polyethylene film, the overlay can include a laterally directed lip which is thermally, adhesively, sonically or otherwise bonded to the liner, thus supplementing the barrier effected by the direct bonding of the overlay by heating of the chime. Adhesive bonding of the overlay to the liner, and the seal enhancement attained thereby, can be effected by extrusion of a bead of adhesive (hot melt, RTV silicone, or the like) into the juncture between the overlay and the lining whether or not a laterally directed lip is provided.

The overlay of the invention is unique in its use of an extruded profile which closely conforms to the shape of the steel chime and, through the inherent memory nature of the material, is stretched and snapped into position over the chime with the overlay intimately engaging the chime for a subsequent thermal or otherwise bonding to the chime and lining. This not only completely isolates the chime from the contents of the drum or container, but also makes the overlay much more resistant to handling abuse, for example laceration or abrasion damage as frequently occurs in drums wherein the plastic sleeve is attached by crimping under the steel chime or by merely heat sealing to the lining and freely overlying the chime. Further, even should some damage occur, for example during the filling or emptying operations when the cover is removed from the drum, any ensuing corrosion of the chime would be localized to the site of the damage, as opposed to more widespread corrosion which could occur after penetration of the sleeves as heretofore commercially practiced or noted in the prior art, as for example represented by the above referenced patent to Gibbs, Jr.

The feature of heat-sealing the overlay material to the drum liner itself has a dual benefit of positively isolating the steel of the chime from the drum contents and at the same time sealing off a pathway for the entry of potentially harmful gases, for example oxygen or water vapor, into the drum by way of the interface between the chime and the end of the drum body.

While the relative thicknesses of the plastic chime overlay and the drum liner or lining do not appear to be significant with regard to the functioning of the invention, that is the protection provided by the overlay, an overlay thickness of 0.020 inch, which is about four times that of the lining, 0.005 inch, has been found to be particularly acceptable. The thickness of the overlay is to be such whereby the formation of an extruded profile is possible with the extrusion being capable of engagement about the chime, preferably by initially forming the extrusion into a closed hoop. A thicker overlay would provide improved abrasion resistance, while a thinner overlay would allow more rapid bonding of the overlay to the lining, and hence lower production costs.

Other objects and advantages of the invention reside in the details of construction as more fully hereinafter presented.

BRIEF DESCRIPTION OF THE DRAWINGS

FIG. 1 is an elevational view of a fibre drum with a portion through the upper chime area broken away for purposes of illustration;

FIG. 2 is an enlarged sectional detail through the chime area;

FIG. 3 is an exploded sectional view illustrating the overlay prior to mounting on the chime;

FIG. 4 is a schematic illustration of a method sequence of forming and mounting the chime overlay;

FIG. 5 is a cross-sectional detail through the chime area of a drum with a modified chime overlay mounted thereon;

FIG. 6 is a cross-sectional detail through the chime area with a further modified overlay mounted thereon; and FIG. 7 is a sectional detail illustrating yet another modified chime overlay.

DESCRIPTION OF PREFERRED EMBODIMENT

Referring now more specifically to the drawings, FIG. 1 illustrates a large capacity drum 10 particularly adapted for storage of aggressive or corrosive materials. The drum 10 is basically of conventional construction including, preferably, a cylindrical fibre board side wall 12, a sealed bottom 14, a chemically inert film lining or liner 16 of polyethylene or the like intimately bonded or otherwise generally continuously integral with the inner surface of the fibre board wall 12 and the bottom closure 14, and a continuous chime 18 folded about the upper edge of the fibre wall around the upper open end of the drum.

Noting the enlarged detail view of FIG. 2, the chime 18 is inwardly and downwardly rolled about the upper edge portion of the cylindrical wall 12, engaging the liner 16 below the upper edge thereof, and defining a bead 20. In slightly spaced relation below the bead 20, the chime 18 is inwardly crimped, along with the portion of the fibre board wall 12 to which the chime is intimately engaged, to define an annular groove 22 about the exterior of the drum and a corresponding inwardly projecting rib 24 about the interior of the drum. The rib 24 defines an upwardly directed shoulder 26 below and inwardly directed relative to the bead 20. The groove 22 includes a downwardly directed upper surface or roof portion 28. Finally, the chime 18, below the exterior groove 22, includes an integral depending skirt portion 30. The purpose of the chime is to reinforce, strengthen and protect the open upper end of the drum, and to also provide a means for securement of the top closure.

The above described drum and chime construction is conventional.

If the drum 10 is to contain corrosive chemicals or the like, it is essential that the drum itself be protected from the destructive nature of the chemicals. While drum linings 16 have been found to appropriately protect the interior of the drum, difficulties have been encountered in protecting the steel chime from the drum contents, particularly inasmuch as the chime is normally subjected to handling abuses at substantially all stages, including the filling and emptying of the drum, the mounting and removal of the lid or closure, etc. The conventionally provided chime-covering sleeves have not been found to be particularly effective. A much more effective means for protecting the chime has been achieved by the protective overlay 32 of the present invention. The overlay 32 is extruded of an appropriate chemically inert or corrosive resistant synthetic resinous material such as carboxylated high density polyethylene or carboxylated polypropylene. The extrusion 32 has a formed shape or profile which is snap-fitted to the chime through the inherent resiliently flexible nature of the overlay and the memory characteristics of the material. The overlay preferably also engages that portion of the drum lining at least adjacent the inner extremity of the chime 18 immediately below the bead 20. As such, the overlay 32 includes an arc or semi-cylindrical upper portion 34 configured for intimate engagement about the chime bead 20 with the free inner edge 36 of the overlay engaging the interior lining 16 immediately adjacent the corresponding inwardly curled edge 38 of the chime bead 20. The edge 36 of the overlay, and the portion immediately adjacent thereto, may be slightly thickened to afford additional rigidity and greater surface contact, particularly with the lining 16.

The overlay 32 includes a vertical outer wall 40 depending from the arcuate upper portion 34 to lie against the outer vertical face of the chime 18 and between the chime bead 20 and the outer groove 22. An integral inwardly directed bottom lip 42 on the overlay 32 extends into engagement with the groove roof 28 defined by the inwardly crimped chime. For additional strength, the overlay 32 can be outwardly thickened along and to both sides of the angular joint between the overlay outer wall 40 and the bottom lip 42. The lip 42 is of a width less than the depth of the groove 22, thus avoiding contact with the inner extremity of the groove such as might prevent a full intimate seating of the overlay in face-to-face contact with the chime.

Attention is now directed to FIG. 4 which schematically illustrates the sequence of forming and mounting the overlay.

Initially, the overlay is formed as an extruded length 44 of appropriate synthetic resinous material. The extruded length is of sufficient strength so as to maintain the formed shape or profile, and is resiliently flexible with an inherent memory to allow for deformation when mounting and a return to the original configuration. The extruded length 44 is cut to length to completely encircle the chime-protected upper end of the drum 10 and is either directly formed about and snap-fitted to the drum chime 18 or, as illustrated, is preferably initially formed to an annular ring 46 with the opposed ends positioned for welding, as at 48, to define a continuous member before mounting to the chime. This continuous member or ring 46 is then snap-fitted, as at 50, into intimate engagement with the chime 18, preferably with the inner edge 36 of the overlay engaging the internal lining 16 immediately below the inner extremity of the chime, as more particularly seen in FIG. 2.

Once the overlay is snap mounted on the chime, the steel chime, as suggested at 52, is induction heated, with or without rotation of the drum and chime, utilizing an appropriate source 54 of electromagnetic energy. The heating of the chime is to effect a melting of the inner surface of the overlay sufficient to obtain a positive fusion bonding of the overlay, throughout the entire surface thereof, to the chime. The exact conforming of the overlay to the chime, and the complete fusion bonding of the overlay to the chime provides an uninterrupted or intimate bond which eliminates any possibility of voids or movement therebetween, resulting in effect in an integral construction. The induction heating of the chime will preferably be such as to produce sufficient melting of the overlay 32 at the inner extreme thickened edge 36 to bond to the liner immediately therebelow, and thus provide a continuous seal from the liner, about the upper portion of the chime and for an appreciable distance down the exterior of the chime.

As the heat for fusion bonding enters the plastic overlay only by conduction from the hot chime, the amount of heat applied can be controlled whereby the outer, visible surface of the chime overlay is not fused and retains its original surface throughout the fusion process. This not only will enable the retention of an aesthetically pleasing chime surface but will also allow, if considered necessary or desirable, the application of pressure, as suggested by the configured plates 56 in FIG. 4, to the chime overlay as a means for assuring and/or enhancing contact between the plastic and the steel during the fusion process. As previously noted, carboxylated high density polyethylene has been found to be particularly acceptable for both extrusion into the desired profile and for fusion bonding to the galvanized steel of the chime by induction heating.

In order to further enhance the integrity of the sealing of the chime and the provision of a continuous barrier to prevent contact between the drum contents and the steel chime, the overlay, as indicated at 58 in FIG. 5, can be formed with an integral extension depending from the inner extremity 60 of the overlay bead portion and comprising a short inner wall 62 depending to the chime shoulder 26 and an inwardly directed lip 64 intimately engaging and extending for a substantial portion of the shoulder 26. This lip 64 will, either simultaneously with the fusion bonding of the overlay to the chime, or subsequent or prior thereto, be thermally or adhesively bonded to the lining 16 throughout the full extent of engagement.

FIG. 6 illustrates a further variation wherein the overlay 66, rather than curling inwardly below the chime bead, depends, as at 68, directly to the chime shoulder 26 whereat the inwardly directed overlay lip 70 intimately engages and is thermally or adhesively bonded to the lining 16.

A third variation in illustrated in FIG. 7 wherein the overlay 72, between the bead portion 74 thereof and the integral inwardly extending lining-engaging lip 76, is formed with an accordion folded or pleated wall section 78. This section 78 allows for slight variations in the height of the distance between the bead and the shoulder, and also can provide for a slight compressive engagement of the overlay lip 76 against the shoulder to ensure intimate contact therewith at the time of the thermal or adhesively bonding of the lip 76 to the liner 16.

As an alternative method of enhancement of the seal between the overlay and the liner, a continuous bead of adhesive can be extruded into the juncture between the overlay and the lining, with or without the lip.

As previously discussed in detail, the fusion bonding of the plastic overlay to the steel, throughout the full area of contact therebetween, substantially reduces the susceptibility of the overlay to abrasion or laceration damage, such as frequently occurs in drums with sleeves either crimped into place by the chime itself or heat sealed to the liner and merely extended in overlying relation to the chime. Further, with the fusion bonded overlay, should damage occur to the overlay, for example during the filling or emptying operation when the cover is removed from the drum, any exposure of the chime and resultant corrosion would be localized to the site of the damage, as opposed to the more widespread corrosion currently noted in the commercially available protective means now in use.

The additional feature of sealing the overlay to the drum lining both effectively isolates the steel of the chime from the drum contents and seals off any pathway for entry of potentially harmful gases, for example oxygen or water vapor, into the drum by way of the interface between the chime and the exterior the drum body.

The foregoing is considered illustrative of the principles of the invention. Other embodiments and/or modifications such as may occur to those skilled in the art, are to be considered within the scope of the invention.

What is claimed is:

1. In a storage drum adapted to contain aggressive materials, said drum including a peripheral side wall with an upper edge portion defining an open upper end adapted to selectively receive an overlying cover, and a closed bottom, an inner lining within said drum, said lining being generally inert to aggressive materials to be contained within said drum, a chime overlying, intimately engaging and defining a bead about the upper edge portion of the side wall peripherally thereabout, said chime conforming to the upper edge portion both interiorly and exteriorly of said drum; the improvement comprising a plastic overlay generally inert to aggressive materials to be contained in said drum, said overlay overlying said chime peripherally about said open upper end and depending for at least a portion of the height of said chime exteriorly of said drum, said overlay depending below said chime interiorly of said drum and terminating in an inner edge portion engaging said lining below said chime, a continuous bond between said overlay inner edge portion and said lining sealing said overlay to said lining peripherally about said open upper end of said drum, said overlay having a continuous inner surface, and an uninterrupted bond between said chime and said inner surface of said overlay for substantially the full extent of said inner surface, said uninterrupted bond providing a continuous seal between said overlay and said chime for the extent of the uninterrupted bond between said overlay inner surface and said chime.

2. The storage drum of claim 1 wherein said continuous bond between said overlay inner edge portion and said lining comprises an adhesive bead therebetween.

3. The storage drum of claim 1 wherein said continuous bond between said overlay inner edge portion and said lining comprises a thermal bond.

4. The storage drum of claim 1 wherein said uninterrupted bond between said chime and said inner surface of said overlay extends from exterior of said drum continuously inward thereof about at least a major portion of said bead.

5. In a storage drum adapted to contain aggressive materials, said drum including a peripheral side wall with an upper edge portion defining an open upper end, and a closed bottom, an inner lining within said drum, said lining being generally inert to aggressive materials to be contained within said drum, a chime overlying and intimately engaging the upper edge portion of the side wall peripherally thereabout, said chime conforming to the upper edge portion both interiorly and exteriorly of said drum; the improvement comprising a plastic overlay generally inert to aggressive materials to be contained in said drum, said overlay overlying said chime peripherally about said open upper end and depending for at least a portion of the height of said chime exteriorly of said drum, said overlay depending below said chime interiorly of said drum and engaging said lining below said chime, a continuous bond between said overlay and said lining sealing said overlay to said lining peripherally about said open upper end of said drum, said overlay having a continuous inner surface, said inner surface of said overlay for substantially the full extent thereof being in uninterrupted engagement with said underlying chime, and an intimate fusion bond between said overlay and said chime bonding said plastic overlay to said chime for the extent of the uninterrupted engagement between said overlay inner surface and said chime.

6. The storage drum of claim 5 wherein said chime is crimped to said upper edge portion of said side wall and defines therewith, peripherally about said drum wall, a bead comprising the upper end of said wall, an interior rib with an upper shoulder having said lining lying thereover, and an exterior groove with an upper surface, said overlay overlying said bead and, exteriorly of said drum, including an inwardly directed lip received in said groove and in bonded engagement with said upper surface of said groove.

7. The storage drum of claim 6 wherein said overlay engagement with said lining interiorly within said drum includes a laterally directed edge portion seating on and engaging said lining on said shoulder, said continuous bond being between said laterally directed edge portion and said lining on said shoulder.

8. The storage drum of claim 7 wherein said chime encircles said bead and terminates above said shoulder, said overlay, between said bead and said shoulder, intimately following the contour of the interior of said drum.

9. The storage drum of claim 7 wherein said overlay, between said bead and said shoulder, includes a continuous accordion fold section thereabout.

10. The storage drum of claim 5 wherein said overlay is induction heat fusion bonded to said chime.

11. The storage drum of claim 10 wherein said fusion bond is a chime induction heated fusion bond.

12. A corrosion resistant protective overlay for the chime of a fibre drum, said overlay comprising an elongate extruded length of abrasion and corrosive resistant plastic, said length having a continuous shape-sustaining cross-section profile including a vertical wall with upper and lower edge portions, a lip integral with said lower edge portion and extending laterally to one side of said vertical wall, and a bead-defining portion integral with said upper edge portion and extending vertically downward in a generally circular arc to the same side of said vertical wall as said lip, said generally circular arc terminating in a lower edge spaced from said wall, said cross-section profile being of generally consistent thickness throughout at least the major extent of said wall, said lip and said bead-defining portion, and thicker than said constant thickness adjacent said lower edge portion of said vertical wall, said overlay being resiliently flexible and adapted to snap-fit over the chime.

13. The overlay of claim 12 wherein said profile at said lower edge of said circular arc is thicker than said constant thickness.

* * * * *